United States Patent Office 3,506,704
Patented Apr. 14, 1970

3,506,704
ESTER PROCESS
Leonard E. Miller, San Anselmo, and Mitchell Danzik, Oakland, Calif., assignors to Chevron Research Company, San Francisco, Calif., a corporation of Delaware
No Drawing. Filed June 17, 1964, Ser. No. 375,917
Int. Cl. C07c 69/78, 69/22, 69/34
U.S. Cl. 260—476          7 Claims

ABSTRACT OF THE DISCLOSURE

In a liquid phase reaction esters are produced by heating $C_4$-$C_{20}$-primary bromides with liquefiable mono- and dibasic carboxylic acids. The reaction rate is improved by the use of lithium bromide and related catalysts.

---

This invention relates to a process for the production of organic carboxylate esters. More particularly, it relates to the production of hydrocarbyl hydrocarbanoate esters. Still more particularly, it relates to a catalytic process for the production of esters from hydrocarbyl bromides and hydrocarbanoic acids.

Organic esters are desirable for many purposes in the art including use as plasticizers, solvents, chemical intermediates, and the like.

n-Alkyl bromides are readily available from the reaction of hydrogen bromide and cracked wax alpha-olefins. Their conversion to alkanols and esters is, however, particularly difficult. This is to be appreciated from the report of Bateman and Hughes, J. Chemical Society, 940 (1940) wherein after a twenty-eight day reaction time, n-butyl bromide and formic acid had been insubstantially converted to n-butyl formate.

A collateral yet important problem in the conversions of hydrocarbyl bromides to esters and carbinols is the necessity for an effective means for recovery of the rather costly bromide values.

In accordance with the present invention, 1-hydrocarbyl hydrocarbanoate esters are produced in a liquid phase reaction of 1-hydrocarbyl bromides with hydrocarbanoic acids at a temperature in the range from about 150–300° C., preferably above 180° C. 1-hydrocarbyl bromides having from 4 to about 20 carbon atoms under these conditions readily interact with mono- and dicarboxylic hydrocarbanoic acids yielding esters and anhydrous hydrogen bromide.

The hydrocarbyl bromides contemplated as feed compounds to the process are primary bromides characterized by the general formula:

$$RCH_2Br$$

in which R is an inert hydrocarbyl radical having at least four carbon atoms and preferably from about 7 to 20 carbon atoms. Higher molecular weight range bromides appear to be useful but product recovery and purification problems in their use are substantial. On the other hand bromides having less than about eight carbon atoms require the use of pressure equipment or recovery and recycle means for continuous introduction of the relatively volatile lower molecular weight bromides into the liquid hydrocarbanoic acid.

By the prefix "hydrocarb" as used in hydrocarbyl and hydrocarbanoic is meant a radical composed of carbon and hydrogen, and by inert hydrocarbyl is meant that in its combined ester and bromide forms and the like no appreciable, i.e., less than about a percent, if any, chemical interaction occurs to alter the radial as by hydrogen bromide addition, thermal degradation, and the like under present reation temperatures.

The reaction of the present process appears to be ionic in nature and to require mutual liquid phase reaction conditions. Little or no reaction appears to take place from the mixing of the feed bromides and acids of the process in the vapor phase. Useful feed acids must be capable of existing in the liquid phase under the conditions of the process, i.e., at a temperature in the range above indicated in the presence of the feed hydrocarbyl bromides.

In general the hydrocarbanoic acids contemplated as feed compounds are characterized by the general formula:

$$R'(CO_2H)_n$$

in which R' is an inert hydrocarbyl radical having from about 4 to 20 carbon atoms. $n$ is an integer and may be one or two. Higher molecular weight acids are also useful but for the reasons set forth above regarding high molecular weight bromides, such feeds are not particularly desirable. For the lower molecular weight acids corrosion resistant pressure reactors may be required to maintain the necessary liquid reaction phase. For this reason acids in which R' has from about 6 to 20 carbon atoms are preferred.

In general useful hydrocarbanoic acids must be at least as nucleophilic as pivalic acid otherwise conversion rates in the process will be impracticable.

Below about 150° C. little or no reaction occurs within practicable reaction periods. On the other hand, at temperatures appreciably above about 300° C. substantial thermal degradation of the bromides is experienced in which olefin and other degradation products are formed.

The present process may be effected with and without the presence of a catalyst. In the absence of a catalyst, however, a substantial excess, of the order of 1 to 9 mols of acid per mol of hydrocarbyl bromide feed, is necessary for the more satisfactory conversion rates. The excess acid constitutes an added separation burden on the process.

In general metal bromide and metal carboxylate ionic salts having an appreciable solubility, i.e., of at least 0.1 weight percent in the liquid reaction medium, have some catalytic effect. On the other hand, only such salts of metals having maximum valence states below 3 appear to be particularly practical an catalysts. Of this latter class, lithium bromide and lithium carboxylate salts are very much more effective than all the others and are preferred. While soluble lithium carboxylate salts in general are useful, the salt corresponding to the feed hydrocarbanoic acid is preferable in order to minimize possible product impurities. Where a different lithium carboxylate salt is used, the catalyst can be converted by a single metathetical exchange to the lithium salt of the feed acid in which the former salt acid component is liberated yielding the free acid.

In a preferred embodiment of the present process, benzoic acid and n-dodecyl bromide in a mol ratio of about 1 to 1, respectively, are heated in a reaction zone at a temperature of about 250–255° C. in the presence of about 2.5 mol percent of lithium benzoate. During this heating, hydrogen bromide is evolved in the course of the reaction, and its removal from the reaction zone is facilitated by passing an inert gas stream, preferably nitrogen, through the reaction mixture. After about a two to three-hour reaction time, the dodecyl bromide is substantially converted to dodecyl benzoate. Conversions are generally to an extent above about 70% and yields, based upon the bromide, are about 90 mol percent and higher. Surprisingly, although hydrogen bromide is well-known to cause extensive discoloration and deleterious effects to most organic chemicals, even at relatively much milder temperatures, very little discoloration and undesirable side effects result under the present severe reaction conditions. The evolved hydrogen bromide is recovered for direct use, for example, for the preparation of 1-hydrocarbyl bromides by free radical catalyzed addition to α-olefins.

Representative hydrocarbyl bromides contemplated for use in the process are such bromides as 1-decyl, 1-dodecyl, 2-ethyl-1-octyl, 1-hexadecyl, benzyl, hexahydrobenzyl, 4,5-dimethyl-1-nonyl, cracked wax 1-n-alkyl bromide mixtures, i.e., $C_{10}$–$C_{20}$ n-alkyl bromides, 3-methyl-1-octyl, 4-methyl-1-pentyl, b-(b-naphthyl)ethyl, b-(α - naphthyl) ethyl, 3-phenylpropyl, n-butyl, isobutyl, 1-hexyl, 5-5-dimethyl-1-hexyl, and the like wherein R of the above general formula may be alkyl, cycloalkyl, alkylcycloalkyl, aryl, alkylaryl, including branched and straight chains and the like. Preferably R contains less than 7 carbocyclic aromatic arbon atoms per group. Primary n-$C_4$–$C_{20}$ alkyl bromides are a preferred class.

Preferred hydrocarbanoic acids are those characterized by the general formula:

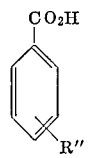

where R″ may be in the ortho, meta, and para position and is an alkyl radical having less than 11 carbon atoms and hydrogen. In general these acids are the most convenient in terms of rate and ease of processing the resultant esters.

The following illustrative examples are not intended to be limiting.

GENERAL REACTION CONDITIONS

Example 1

A liquifiable organic acid and an n-alkyl bromide were charged in the desired molar proportions into a glass reaction flask fitted for stirring, temperature determination, reflux condensing, basal admission port for inert gas flow, and a controlled heating means. Other materials such as catalysts were also charged as desired. The charge was heated to temperature, stirred, and, as desired, a stream of nitrogen passed through the reaction mixture. The evolved anhydrous hydrogen bromide was passed through the condenser, collected, and measured. In general, the resulting ester was analyzed and recovered conventionally.

As described above and under the conditions and variations and variations noted, the following experiments and results, Table I, were carried out and obtained:

TABLE I

| | Feed | | Mol ratio, A/B | Temp., °C. | Time, Hrs. | Conversion, percent | Ester yield, percent |
|---|---|---|---|---|---|---|---|
| | Acid (A) | Alkyl bromide (B) | | | | | |
| Run No: | | | | Temperature | | | |
| 1 | Benzoic | $C_8H_{17}Br$ | 1/1 | 210–220 | 72 | 75 | 57 |
| 2 | ClCH₂CO₂H | $C_8H_{17}Br$ | 10/1 | 180–85 | 6 | 57 | 60 |
| 3 | Benzoic | $C_8H_{17}Br$ | 10/1 | 240–50 | 7 | 81 | 91 |
| 4 | p-Toluic | $C_{12}H_{25}Br$ | 8/1 | 250–270 | 2 | 68 | 86 |
| | | | | Mol Ratio, A/B | | | |
| 5 | Benzoic | $C_{12}H_{25}Br$ | 10/1 | 250–55 | 3 | 92 | 90 |
| 6 | do | $C_{12}H_{25}Br$ | 8/1 | 250–55 | 3.2 | 92 | 97 |
| 7 | do | $C_{12}H_{25}Br$ | 5/1 | 250–55 | 3.3 | 87 | 90 |
| 8 | do | $C_{12}H_{25}Br$ | 3/1 | 245 | 5.5 | 80 | 92 |
| 9 | do | $C_{12}H_{25}Br$ | 8/1 | 245–50 | ª 4 | 55 | 90–95 |
| 10 | Phthalics (ᵇ) | $C_{12}H_{25}Br$ | 5/1 | 245–50 | 4 | 0 | 0 |

(ª) No nitrogen sweep.
(ᵇ) Ortho-, iso-, and terephthalic acids were tried. No product was produced as shown by lack of hydrogen bromide evolution. Ortho-phthalic acid does not exist as the acid in the liquid phase, but preferentially dehydrates to the acid anhydride. Iso- and terephthalic acids are unreactive insoluble solids in this system.

Representative hydrocarbanoic acids contemplated include the following: isobutyric, n-butyric, isovaleric, n-valeric, 2-methyl-1-butanoic, 3,3-dimethyl-1-butanoic, 2,2-dimethyl - 1 - butanoic, 2,3 - dimethyl - 1 - butonoic, 2 - ethyl - 1 - butanoic, 2,3 - dimethyl - 1 - pentanoic, 2 - methyl - 1 - pentanoic, 1 - heptanoic, cyclohexane carboxylic, 1 - octanoic, 1 - nonanoic, 3 - phenyl - 2 - methyl - 1 - propanoic, 1 - undecanoic, glutaric, adipic, pimelic, sebacic, suberic, 1 - ethylphenylacetic, b - phenylpropionic, 1 - pentadecanoic, 1 - tetradecanoic, phenylacetic, o-toluic, p-toluic, m-toluic, benzoic, α-naphthylacetic, β-naphthylacetic, α-naphthoic, β-naphthoic, as well as inertly substituted carbocyclic aromatic acids having less than 11 carbocyclic aromatic carbon atoms per molecule, such as p-chloro-benzoic, 4 - chloro - 1 - naphthoic, p-nitrobenzoic, and the like.

The above data demonstrates operability of the process over a wide range of temperatures. For acids of the order of the acid strength of benzoic acid, the reaction threshold temperature is about 180° C. Stronger acids have somewhat lower initial temperatures. Reaction rates are seen to increase with temperature. The upper limit, where degradation becomes substantial, i.e., greater than 5 percent, is dependent upon thermal degradative side effects which, depending upon the particular reaction couple, became noticeable in the range 300–400° C.

Also demonstrated is the favorable effect of excess acid relative to the alkyl bromide. Thus, in general, with increasing organic acid to alkyl bromide mol ratios, reaction and conversion to ester is proportionately favored. No appreciable advantage is indicated from the use of more than 10 mols of acid per mol of bromide. From a comparison of Examples 6 and 9, the importance of an inert gas sweep is shown. The sweep roughly doubles the conversion rate. A secondary and material advantage resulting from the use of an inert gas sweep is minimization of possible oxidative side reaction from atmospheric oxygen.

In Table II following are listed further examples demonstrating catalysis in the ester forming reaction. In the runs, benzoic acid and n-dodecyl bromide were charged to the reactor in a 1:1 mol ratio as described above.

in the present process. On the other hand, run 28 shows that secondary bromides are substantially converted to olefin rather than ester. Similarly, run 27 shows that while 1-hydrocarbyl chlorides do react, rates are very much slower than for bromides.

Runs 35–37 show that liquifiable dicarboxylic acids are also convertible to ester as should also be converted such acids as stearic, dodecanoic, and the like.

TABLE II

| Run No.: | Cataylst | Mol percent of RBr | Temp., °C. | Time, hours | Percent conversion |
|---|---|---|---|---|---|
| 11 | None [1] | | 255 | >10 | 85 |
| 12 | Lithium benzoate | 1.25 | 256–83 | 5.3 | 96 |
| 13 | do | 2.50 | 255–60 | 4 | 85 |
| 14 | do | 2.50 | 255–60 | 1.5 | 68 |
| 15 | do | 2.50 | 257–86 | 1.1 | 73 |
| 16 | do | 5.0 | 250–57 | 1 | 42 |
| 17 | Sodium benzoate | 5.0 | 255 | 1.5 | 32 |
| 18 | Sodium bromide [2] | 2.5 | 255 | >10 | 86 |
| 19 | Potassium benzoate [2] | 2.5 | 255 | >10 | 85 |
| 20 | Lithium bromide | 2.5 | 255 | 2.5 | 85 |
| 21 | do | 1.25 | 255 | 1.75 | 73 |
| 22 | (n-Butyl)$_3$N:HBr | 2.5 | 243–53 | 2.3 | 71 |
| 23 | (CH$_3$)$_4$N$^+$Br | 2.5 | 251–56 | 2 | 75 |
| 24 | Calcium benzoate | 2.5 | 255–60 | 2.5 | 69 |

[1] Estimated.
[2] Insoluble.

Small catalytic effects were noted when ferric and nickel benzoates were used.

The above experiments demonstrate that soluble ionic organic carboxylate and bromide salts are useful catalysts. They also show that convenient stoichiometric amounts of acid and hydrocarbyl bromide may be used provided a suitable catalyst is employed. Lithium carboxylates and lithium bromide are particularly effective catalysts. Runs 22 and 23 show that ammonium type compounds are catalytic for the esterification reaction. However, they also catalyze an elimination side reaction to a substantial degree and thus an appreciable, undesirable conversion of hydrocarbyl bromide to olefin is also experienced in their use.

Comparison of runs 15 and 16 show that no advantage is to be expected by the use of amounts of catalyst in excess of about 5 mol percent based on the hydrocarbyl bromide.

FEED VARIATIONS

As in the prior examples and with the variations noted in Table III following, additional runs were carried out demonstrating other feed compounds.

HYDROGEN BROMIDE RECOVERY

As described above benzoic acid and n-C$_{11-15}$ bromide were charged to a glass reaction vessel in a mol ratio of 8 to 1, respectively. A stream of nitrogen gas was introduced into the reaction medium and then the reaction mixture was heated to about 250° C. The evolved hydrogen bromide and nitrogen carrier gas was discharged via the reflux condenser into a transfer line thence to a reaction vessel charged with about 25 ml. C$_{11-15}$ α-olefin and 25 ml. n-pentane at about 22° C. containing about 0.5 ml. of methyl ethyl ketone peroxide as the free radical addition catalyst. Introduction of the hydrogen bromide gas into the C$_{11-15}$ α-olefin was at a point below the liquid surface. A rapid and essentially quantitative addition of the hydrogen bromide resulted yielding n-C$_{11-15}$ alkyl bromide.

The foregoing embodiments of the present invention are illustrative only. It is not intended that the invention shall be construed as limited to the details of the description, except insofar as such limitations have been included in the terms of the following claims.

What is claimed is:

TABLE III

| Run No. | Feed Acid (A) | Alkyl halide (B) | Mol ratio, A/B | Temp., °C. | Time, hrs. | Conversion, percent | Ester yield, percent |
|---|---|---|---|---|---|---|---|
| 25 | Benzoic | 1-C$_{11-15}$H$_{23-31}$Br | 8/1 | 245–50 | 2 | 60 | 90–95 |
| 26 | do | 1-C$_{16}$H$_{33}$Br | 8/1 | 250–60 | 1.5 | 76 | 64 |
| 27 | do | 1-C$_{12}$H$_{25}$Cl | 8/1 | 240–45 | 2.1 | 21 | 81 |
| 28 | do | X-C$_{12}$H$_{25}$Br | 8/1 | 195–220 | 2 | 97 | [1] 15 |
| 29 | o-Toluic | 1-C$_{12}$H$_{25}$Br | 8/1 | 240–55 | 2.2 | 78 | 88 |
| 30 | p-Toluic | 1-C$_{12}$H$_{25}$Br | 8/1 | 250–69 | 2.5 | 68 | 86 |
| 31 | m-Toluic | 1-C$_{12}$H$_{25}$Br | 8/1 | 251–59 | 1.6 | 84 | 61 |
| 32 | p-Cl-benzoic | 1-C$_8$H$_{17}$Br | 3/1 | 230–50 | 5.7 | 50 | [2] 80 |
| 33 | do | 1-C$_8$H$_{17}$Br | 10/1 | 245–80 | 7 | 91 | 73 |
| 34 | p-ClC$_6$H$_4$SO$_3$H | 1-C$_8$H$_{17}$Br | 3/1 | [3] | | | |
| 35 | Adipic | 1-C$_{12}$H$_{25}$Br (5% lithium adipate catalyst) | 1/2 | 257–260 | 2 | [2] 42 | |
| 36 | Sebacic | 1-C$_8$H$_{17}$Br | 5/1 | 251–263 | 5 | [2] 48 | |
| 37 | Suberic | 1-C$_8$H$_{17}$Br | 5/1 | 227–253 | 2 | [2] 67 | |

[1] X-C$_{12}$H$_{25}$Br mainly secondary bromide . . . 70% yield of olefin recovered.
[2] Based on HBr evolution.
[3] Acid decomposed on heating of mixture.

The above results are a further showing that liquifiable organic hydrocarbanoic acids and 1-hydrocarbyl bromides can be converted to ester. Inertly substituted acids may also be substituted as runs 32 and 33 demonstrate.

Runs 1, 5, 25, 26 show that C$_8$–C$_{16}$ and mixtures thereof of 1-hydrocarbyl bromides are readily convertible to ester 1. The process for the production of an ester and anhydrous hydrogen bromide which comprises reacting an alkyl bromide with a monobasic carboxylic acid by heating in the liquid phase a mixture consisting essentially of said reactants, said heating being at a temperature in the range above 180° C. but below substantial thermal degradation temperatures of the reactants, said mixture containing for each mol of the bromide from about 1 to 10 mols of the carboxylic acid, said bromide being selected from the group consisting of primary n-alkyl bromides containing from 4 to 20 carbon atoms, said carboxylic acid being of the formula $RC_6H_4CO_2H$ wherein R is selected from the group consisting of hydrogen and alkyl groups containing less than 11 carbon atoms, thereby producing the corresponding primary n-alkyl carboxylate ester and anhydrous hydrogen bromide.

2. The process of claim 1 wherein said reaction is catalyzed by the presence as solute in said reaction phase of at least about 0.1 weight percent, based upon the liquid phase, of a salt selected from the group consisting of lithium, calcium, $(n\text{-butyl})_3N{:}H^+$ bromides and carboxylate salts of said acids.

3. The process of claim 1 wherein R of said formula is methyl.

4. The process of claim 1 wherein an inert gas is passed into said liquid reaction mixture during said reaction.

5. The process for the production of a primary n-alkyl benzoate ester and anhydrous hydrogen bromide which comprises reacting benzoic acid with a primary n-alkyl bromide containing from 4 to 20 carbon atoms in said alkyl group by heating said reactants in the liquid phase at a temperature in the range above 180° C. and below 300° C. wherein said mixture contains for each mol of the bromide from about 1 to 10 mols of said acid, thereby producing the corresponding n-alkyl benzoate and anhydrous hydrogen bromide.

6. The process of claim 5 wherein said reaction is catalyzed by a salt selected from the group consisting of lithium, calcium, $(n\text{-butyl})_3NH^+$ and $(CH_3)_4N^+$ bromide and benzoate, said salt being present as a solute in said reaction mix in an amount of at least about 0.1 weight percent based upon the liquid phase.

7. The process of claim 5 wherein an inert gas is passed into said liquid reaction mixture during said reacting.

References Cited

UNITED STATES PATENTS 3,278,569  10/1966  Simon et al. _____ 260—493

FOREIGN PATENTS 169,040  7/1934  Switzerland.

LORRAINE A. WEINBERGER, Primary Examiner

E. J. GLEIMAN, Assistant Examiner

U.S. Cl. X.R.

260—410.9, 456, 468, 469, 471, 475, 485, 487, 493